United States Patent

Vinson et al.

[15] 3,655,416

[45] Apr. 11, 1972

[54] LIPID-PROTEIN MEMBRANE AND PROCESS

[72] Inventors: Leonard J. Vinson, Glen Rock, N.J.; Thomas Masurat, London, England

[73] Assignee: Lever Brothers Company, New York, N.Y.

[22] Filed: Dec. 18, 1968

[21] Appl. No.: 784,943

[52] U.S. Cl. ............................ 106/155, 106/131, 106/159, 106/161, 128/155, 424/28, 424/36, 424/95
[51] Int. Cl. .......................................... C08h 1/06, C08h 7/06
[58] Field of Search ............................... 128/155–157, 200; 106/131, 159, 155, 161; 424/28, 36, 95

[56] References Cited

UNITED STATES PATENTS

| | | | |
|---|---|---|---|
| 3,483,289 | 12/1969 | Michaelson et al. | 106/161 |
| 3,033,755 | 5/1962 | Jacobi | 424/95 |
| 967,737 | 8/1910 | Diesser | 106/159 |
| 1,009,547 | 11/1911 | Misaki | 106/159 |
| 1,247,900 | 11/1917 | Tarrant | 106/159 |
| 2,685,521 | 8/1954 | Edgar | 106/131 |
| 2,868,656 | 1/1959 | Patten et al. | 106/136 |
| 3,370,969 | 2/1968 | Powell et al. | 106/131 |
| 3,404,991 | 10/1968 | Taylor et al. | 106/131 |
| 3,421,501 | 1/1969 | Beightol | 264/22 |
| 3,451,394 | 6/1969 | Bechtol et al. | 106/122 |

FOREIGN PATENTS OR APPLICATIONS

| | | | |
|---|---|---|---|
| 859,374 | 4/1959 | Great Britain | 424/95 |
| 556,488 | 8/1932 | Germany | 424/95 |

*Primary Examiner*—Julius Frome
*Assistant Examiner*—John H. Miller
*Attorney*—Brumbaugh, Graves, Donohue & Raymond

[57] ABSTRACT

A lipid-protein membrane having water vapor permeability characteristics similar to those of mammalian skin is produced by combining stratum corneum cells with an unsaturated fatty acid in controlled amounts in carbon tetrachloride to form an emulsion, casting the emulsion into a thin film on a smooth surface, and oxidizing the film to form a strong membrane having a lipid-to-protein ratio between the range of 1.25 to 2.5.

3 Claims, No Drawings

LIPID-PROTEIN MEMBRANE AND PROCESS

This invention relates to improved membranes useful in treating animal wounds and to a method of preparing the membranes.

In the course of investigating the permeability of various structures found in the skin of mammals and a related study of means of improving or of seriously damaging the various structures responsible for the barrier characteristics of skin, the applicants have developed an improved membrane which can be made to substantially duplicate the water vapor transmission characteristics of mammalian skin. In addition, the membrane is relatively resistant to the action of solvents, and will interact with and be bound to the surface of the corneum. At the same time, low antigenic reactions will result by the proper selection of the materials from which the membrane is made.

Proteins are known to form complex molecules with a wide variety of substances such as alkyl benzene sulfonates, p-aminoazo benzene, phospholipids, sterols, and various other lipid materials. Most of these complexes are labile and can be easily ruptured to give back the constituent molecules in their original form. Little is known of the structure of these conjugated proteins, although they have been the subject of much study.

In accordance with the present invention it has been found that membranes having approximately the same water vapor transmission characteristics as the stratum corneum of mammals is provided by forming a homogeneous mixture of an unsaturated fatty acid and protein and, in the presence of a suitable solvent, casting the mixture on a smooth surface to form a film, drying the film and subjecting it to oxidizing conditions as by subjecting it to a mild heat in the presence of air. The resulting membrane has the water vapor transmission characteristics of the stratum corneum of mammals, is sturdy enough to be readily handled, and has low antigenic reaction. The coherent film resembles latex and is useful as protective covering for damaged or impaired skin areas.

The membranes of the present invention are obtained by first forming a homogeneous mixture comprising unsaturated fatty acids and the protein desired. This mixture is then cast on a smooth surface in the form of a thin film and the film is oxidized and polymerized to form a tough, hardy, easily handlable film which resists solution in water and which has highly desirable water-permeability characteristics.

The unsaturated fatty acids used in the compositions of this invention are preferably supplied with natural vegetable oils such as safflower oil or linseed oil which normally contain large quantities of unsaturated fatty acids.

The proteins which have been found to be useful according to this invention include albumens, such as egg albumen, gelatin and natural stratum corneum cells, obtained by procedures, for example as described in the copending application of Vinson and Masurat, Ser. No. 351,010, filed Mar. 11, 1964 now abandoned.

Preparation of Stratum Corneum Membrane

Twenty-four to 48 hour old neonatal rats were used as a source of skin because of their relative freedom from hair. The skin was removed from the torso of the newborn rats as a sheet. The layer of subcutaneous fat was removed by careful scraping with a scalpel. The skin sheets were rinsed in distilled water, blotted dry, spread on filter paper and stored in a deep freeze at −15° C. Forty to 50 neonatal skins were suspended in 50 ml. of a digestion solution consisting of Krebs-Ringer bicarbonate buffer containing 2 M urea and 0.5 percent by weight of trypsin (Nutritional Biochem. Co. X2). The skins were incubated for 30–40 minutes at 37° C. with shaking. At the end of this period, the epidermal layer, including the stratum corneum, was separated from the dermis with forceps. The sheets of epidermis were resuspended in 50 ml. of a fresh digestion solution, as described, containing 50,000 units of penicillin G (potassium salt) and 20,000 units of streptomycin sulfate (to retard bacterial growth).

After 18 hours incubation at 37° C. with shaking, the intact sheets of stratum corneum were removed from the solution, washed several times in distilled water and stored in a beaker of distilled water in the refrigerator.

Extraction of "Barrier Lipid" Fraction

Sheets of stratum corneum prepared as described above were suspended in a solution of chloroform-methanol (2:1, by volume) by mechanical agitation. A large number of the stratum corneum cells became dissociated from the membrane. These cells could be seen as a hazy suspension in the chloroform-methanol solution when the suspension was permitted to dry on an exposed glass surface. An amorphous, granular deposit of barrier lipid was formed in which individual stratum corneum cells were imbedded.

In an alternative procedure, the stratum corneum membranes were blotted with filter paper and 15 grams of the damp stratum corneum membranes were suspended in 100 ml. of a solution consisting of 2 parts by volume of chloroform to 1 part methanol, and were homogenized in a "Virtis" blender at top speed (about 20,000 r.p.m.) for 3–4 minutes. A magnetic stirrer can be used instead of a blender. This resulted in a virtually complete dissociation of the stratum corneum membrane into individual cells, but the cells were not ruptured. About 50 ml. of methanol were added to the suspension in order to reduce the density of the solvent sufficiently to permit sedimentation of the cells by centrifugation. The cell suspension was centrifuged for 10 minutes in an International Model V centrifuge at 1,200 r.p.m. The supernatant volume was decanted and the cells were washed 4–5 times by resuspending them in about 60 ml. of equal parts by volume of chloroform-methanol.

After the final chloroform-methanol wash of the stratum corneum, the stratum corneum cells were suspended in 200 ml. of chloroform-methanol (2:1,v./v.), and stirred with a magnetic stirrer for at least 48 hours at room temperature to extract additional quantities of lipids. At the end of this period sufficient methanol was added to the suspension to sediment the cells by centrifugation. The sedimented cells were freed of the chloroform-methanol solvent, dried by 3–4 washings with anhydrous ethyl ether, then air dried at room temperature. After the last trace of ether had evaporated, the stratum corneum material appeared as a pure white, loosely packed powder. Under microscopic examination the powder was seen to consist of individual, morphologically intact stratum corneum cells. The cells were transferred to vials and stored in a dessicator.

A chemical analysis was carried out on the dissociated stratum corneum cells. They consist primarily of insoluble protein and polysaccharide. The elemental analysis of the dissociated cells gave the following compositions:

| Components | Percent |
| --- | --- |
| Carbon | 46.58 |
| Hydrogen | 7.36 |
| Nitrogen | 16.40 |
| Oxygen | 28.00 |
| Sulfur | 1.56 |
| Phosphorus | 0.18 |

A preferred group of proteins are those selected from the group consisting of albumen, gelatin and stratum corneum cells.

Variation in the ratio of lipid to protein used in the membranes of this invention will vary the mechanical properties of the membrane and the water-diffusion rate of the final membrane. The optimum ratio of lipid to protein is in the range of from 1.25 to 1, to 2.5 to 1. Ratios within this range gave good mechanical strength and pliability. Higher levels of lipid, i.e., higher ratios, give membranes that are tacky and somewhat difficult to handle. On the other hand, lower ratios give membranes which are brittle and therefore unusable for many purposes. The water-diffusion rate decreases as the proportion of lipid increases.

Optional ingredients include hemoglobin and lipoxidase, which may be used to accelerate the rate of peroxide formation.

The membranes of this invention have water vapor transmission rates within the range of about 0.1 to about 2.5 mg./cm.$^2$/hr. Rates near the lower part of the range approximate those of mammalian skin. This is a valuable property in that such membranes retard moisture loss and assist in retaining body moisture without forming a complete vapor barrier.

In some instances, separation of the oil from the mixture will occur and it is therefore desirable to incorporate a solvent such as carbon tetrachloride in the paste formed by combining the fatty acid-containing oil and protein.

The following examples illustrate procedures for carrying out the process and for obtaining the products of the present invention.

EXAMPLE I

Two grams of a commercially pure gelatin and 30 mg. of hemoglobin were combined dry and thoroughly mixed. The mixture of proteins was then added to 5 ml. of commercial raw linseed oil and the mixture was dispersed as a smooth paste. The paste was then spread as a thin uniform film on a glass plate and exposed for 1 hour to a short wave ultraviolet lamp spaced at a distance of about 6 inches from the plate. The plate was then placed in an oven at approximately 50° C. for 72 hours. At the end of the drying time, the film had dried to a cohesive membrane which could be readily peeled from the glass plate. The resulting strong pliable membrane resembled latex.

EXAMPLE II

Following generally the procedure set forth in Example I, membranes were prepared from each of the following mixtures: gelatin and linseed oil, albumen and linseed oil, and albumen and safflower oil. In making these membranes, 2 volumes of carbon tetrachloride were added to the paste with uniform mixing and the diluted paste was spread on a silicone-treated glass plate. The hemoglobin was replaced by lipoxidase at a 0.5 percent by weight level in the protein mixture. Finally, variation in membrane thicknesses was obtained by spreading three separate volumes of paste over a given area. 0.5 ml., 1.0 ml. and 1.5 ml. volumes were each spread over a 12 square centimeter area.

The permeability properties of the membranes were determined by measuring the water-diffusion rate. The rates obtained ranged from 1.24 to 2.15 mg.cm.$^2$/hr. These rates indicate that the membrane supplies an appreciable barrier to water-diffusion. The following table gives the results obtained.

TABLE 1

| Membrane | Diffusion Rate |
|---|---|
| | mg./cm.$^2$/hr.) |
| Linseed Oil/Albumen | 1.34 |
| | 1.24 |
| Safflower Oil/Albumen | 1.52 |
| | 2.01 |
| | 2.15 |
| Neonatal Rat Whole Skin | 0.15 |

EXAMPLE III

Table 2 below gives the formulation of various emulsions made with safflower oil, with and without albumen, and with several other optional ingredients. The membranes described in the table were prepared by taking 0.5 ml. of the various emulsions described, placing them on glass plates which had been previously coated with a silicone, and leaving the coated plates for 4 days in a steam oven at approximately 50° C. The membranes were then mounted on diffusion chambers and water-diffusion measurements were taken.

Some of the membranes from each batch were subjected to chloroform-methanol extraction (2:1 v./v.) by allowing the membranes to stand in the solvent for 5 minutes. After this time had elapsed, the membranes were removed from the solvent and were allowed to air dry for 1 hour on glass plates. They were then mounted for water-diffusion measurements.

TABLE 2.—COMPOSITION AND DIFFUSION RATES OF VARIOUS CORNEUM CELL MEMBRANES (All membranes contained 0.5 gram of corneum cells and 10 mg. of lipoxidase emulsified in 5.0 ml. carbon tetrachloride in addition to the other added substances listed in the table)

| | 1 | 2 | 3 | 4 | 5 | 6 | 7 |
|---|---|---|---|---|---|---|---|
| Safflower oil, ml | 2.0 | 2.0 | 2.0 | 2.0 | 3.0 | 3.0 | 3.0 |
| Albumen, mg | | | | 200 | | 200 | 200 |
| Cholesterol, mg | | 100 | | 100 | | | |
| Δ 3,5-7-keto cholesterol, mg | | | | | 100 | 100 | |
| Cholesteryloleate, mg | | | 100 | | | | |
| | | | | Unextracted | | | |
| Diffusion rate (mg./cm.$^2$/h.) | 1.37 | 1.56 | 1.63 | 0.37 | 7.86 | 3.43 | 7.95 |
| S. D.± | 0.15 | 0.09 | 0.18 | 0.002 | 1.51 | 1.22 | 2.06 |
| No. of membranes | (8) | (6) | (7) | (8) | (8) | (7) | (8) |
| | | | | Chloroform-Methanol Extracted | | | |
| Diffusion rate (mg./cm.$^2$/h.) | 1.33 | 1.59 | 1.42 | 0.38 | 9.78 | 3.93 | 7.12 |
| S. D.± | 0.12 | 0.86 | 0.28 | 0.003 | 0.24 | 0.79 | 1.43 |
| No. of membranes | (4) | (4) | (3) | (5) | (6) | (5) | (5) |

The sets of corneum cell membranes having high water diffusion rates were No. 5 in Table 2 which contain safflower oil and Δ3,5-7-keto cholesterol and No. 7 in Table 2 which contain safflower oil and albumen.

Membrane No. 4 had the lowest water-diffusion rate and this rate is similar to that obtained for whole neonatal rat skin or corneum. Furthermore, these membranes were not ruptured by treatment for 5 minutes with chloroform-methanol and their water-diffusion rates were not affected. These same membranes were constructed to contain approximately the same percentage of corneum cells as found in stratum corneum. The albumen-linoleic acid complex which forms during the drying of the membrane takes the place of the natural polar-lipid which occurs in natural stratum corneum.

EXAMPLE IV

Antibacterial substances were incorporated into the membranes of Example II. Penicillin at a level of 1,000 and 10,000 p.p.m., streptomycin at levels of 1,000 and 10,000 p.p.m. and TBS at 1,000 and 10,000 p.p.m., as well as hexachlorophene were employed, and in every case, good antibacterial activity against Staph. aureus was observed, using discs of the impregnated membrane on single thin layer seeded agar plates.

We claim:

1. The process of preparing a stratum corneum cell membrane which comprises the steps of
   a. obtaining intact discrete stratum corneum cells by
      1. digesting mammal skins in a buffered trypsin solution to separate the epidermal layer therefrom,
      2. further digesting the epidermal layer with trypsin solution to separate the stratum corneum membrane from underlying tissue,
      3. agitating the stratum corneum membrane in the presence of a solution consisting of 2 parts by volume of chloroform to 1 part methanol to cause dissociation of the stratum corneum membrane into individual cells,
      4. agitating the cells with additional quantities of chloroform - methanol, 2:1, v./v.) and,
      5. drying the cells,
   b. combining, as an emulsion in carbon tetrachloride, the stratum corneum cells with an unsaturated fatty acid in relative proportions such that a membrane having a lipid-to-protein ratio in the range of 1:25 to 1 to 2.5 to 1 is obtained,
   c. casting the emulsion on a smooth surface as a thin film, and
   d. oxidizing the mixture to form a tough, polymerized membrane.

2. A membrane of stratum corneum cells prepared in accordance with the method of claim 1, and having a rate of water vapor transmission within the range of about 0.1 to about 2.5 mg./cm.$^2$/hr.

3. The process of preparing a stratum corneum cell membrane comprising the steps of
   a. forming a homogeneous mixture of 0.5 grams of lipid-free stratum corneum cells obtained by the method set forth in step (a) of claim 1, 10 mg. of lipoxidase, 2.0 ml. safflower oil, 200 mg. albumen and 100 mg. cholesterol in 5.0 ml. carbon tetrachloride,
   b. spreading the homogeneous mixture as a thin film over a silicone-coated glass plate,
   c. maintaining the coated plate in a steam oven at about 50° C. for about 4 days, and
   d. removing the film from the plate.

* * * * *